US011903373B1

(12) United States Patent
 Mosley, Jr.

(10) Patent No.: US 11,903,373 B1
(45) Date of Patent: Feb. 20, 2024

(54) CONTAINER FOR STORING FISHING LURES

(71) Applicant: Gerald Mitchell Mosley, Jr., Saraland, AL (US)

(72) Inventor: Gerald Mitchell Mosley, Jr., Saraland, AL (US)

( * ) Notice: Subject to any disclaimer, the term of this patent is extended or adjusted under 35 U.S.C. 154(b) by 113 days.

(21) Appl. No.: 17/737,776

(22) Filed: May 5, 2022

(51) Int. Cl.
 *A01K 97/06* (2006.01)

(52) U.S. Cl.
 CPC .................. *A01K 97/06* (2013.01)

(58) Field of Classification Search
 CPC ........ A01K 97/06; A01K 97/00; A01K 99/00; A01K 87/009
 USPC ....................................................... 206/315
 See application file for complete search history.

(56) References Cited

U.S. PATENT DOCUMENTS

| 2,220,817 | A | | 11/1940 | Holmes |
| 2,711,050 | A | | 6/1955 | McIntyre |
| 3,350,810 | A | | 11/1967 | Warner et al. |
| 4,589,546 | A | * | 5/1986 | Sunderland ............ A01K 97/06 220/252 |
| 4,827,658 | A | * | 5/1989 | Wolniak ................ A01K 97/06 43/57.1 |
| 4,829,699 | A | | 5/1989 | Perkins |
| 4,972,625 | A | | 11/1990 | Barnes |
| 5,344,024 | A | * | 9/1994 | Cohu ........................ B07C 7/04 209/706 |
| 5,593,061 | A | | 1/1997 | Prochnow |
| 5,967,315 | A | * | 10/1999 | Langtry, II ............. A01K 97/06 220/507 |
| 10,648,722 | B2 | | 5/2020 | Smith |
| 10,821,597 | B2 | | 11/2020 | Berger et al. |
| 11,109,581 | B2 | | 9/2021 | Langley et al. |
| 2010/0257771 | A1 | * | 10/2010 | Debono ................. A01K 97/06 43/54.1 |
| 2018/0014520 | A1 | | 1/2018 | Langley et al. |
| 2019/0000199 | A1 | | 1/2019 | Africa et al. |

OTHER PUBLICATIONS

TrollingMate OffShore, LLC, "Ready Bucket Insert", Web Page, available at https://trollingmate.com (last visited Jul. 15, 2022).

* cited by examiner

*Primary Examiner* — Javier A Pagan
(74) *Attorney, Agent, or Firm* — AdamsIP, LLC

(57) ABSTRACT

A container for storing fishing lures is provided. The container includes a main compartment that is subdivided into multiple sub-compartments each for receiving a fishing lure to be stored. The sub-compartments are vertically oriented within the main compartment. Each sub-compartment has a bottom that is positioned above a bottom of the container so as to form a drainage area below the sub-compartments. Each sub-compartment may drain through an opening in the sub-compartment bottom. The container includes a leader storage area above all of the sub-compartments for storage of leaders attached to individual fishing lures. The container may include a drain for draining water from the drainage area. The container may also include a hose fitting for flushing the container with fresh water.

20 Claims, 5 Drawing Sheets ations that
CONTAINER FOR STORING FISHING LURES

FIELD OF THE INVENTION

The present disclosure relates generally to a container for storage of fishing lures.

BACKGROUND

Fishermen often carry numerous fishing lures with them on a fishing trip in order to have options for changing lures based on the fishing conditions, the targeted fish species, and other factors. A variety of different styles of tackle boxes are known for storing and transporting fishing lures and/or other types of fishing tackle. When fishing offshore, larger lures are typically used, particularly when targeting large offshore species such as marlin or tuna. Leaders are also typically used when targeting large offshore species because the leader line is likely to come into contact with the jaw, bill, or fins of larger fish, which may be sharp and thus increase the likelihood of the line breaking. Leader line is generally a stronger line than the main line to withstand such abrasion and prevent breakage of the line and loss of the fish.

Larger lures used for offshore fishing often have leader line pre-rigged with the leader tied or otherwise attached to the lure. When rigging a line for fishing, the pre-rigged leader of a desired fishing lure may be tied directly to the main line, which is spooled onto a fishing reel. Due to the large size of offshore fishing lures, storage and transport of numerous lures on a fishing trip may be problematic, particularly with leader line attached to each of the lures. In addition, once a lure that has been used for fishing is removed from the line, saltwater corrosion becomes an issue if the lure is immediately placed into a container without being rinsed with fresh water and allowed to dry. If placed into a container with other lures, saltwater corrosion may become a problem even for lures that have not been used in saltwater if the lures come into contact with each other. It is desired to have a storage container that overcomes these drawbacks.

SUMMARY

In one aspect, a container for storing fishing lures is provided. The container comprises a container bottom and a container wall that is connected to the container bottom and extends upwardly from the container bottom. The container bottom and container wall define a main compartment of the container. The main compartment is subdivided into a plurality of sub-compartments disposed within the main compartment and separated by divider walls. The main compartment has an open upper end, and the container preferably includes a lid for covering the open upper end to enclose the main compartment. The sub-compartments are vertically oriented so that each of the sub-compartments is accessible through the open upper end when the lid is opened. The container further comprises a sub-compartment bottom that defines a bottom of each of the sub-compartments. The sub-compartment bottom is disposed within the main compartment in a position above the container bottom such that the sub-compartment bottom and the container bottom define a lower volume disposed between the sub-compartment bottom and the container bottom. The sub-compartment bottom has a plurality of openings extending through the sub-compartment bottom. Each respective one of the sub-compartments is in fluid communication with the lower volume through at least one opening in the sub-compartment bottom that corresponds to an individual sub-compartment. In addition, each of the divider walls has an upper edge that is positioned below an upper edge of the container wall such that an upper volume is disposed between the upper edge of each of the divider walls and the upper edge of the container wall. When the lid is placed onto the container to close the container, the upper volume is disposed between the upper edge of each of the divider walls and an interior side of the lid. The lower volume preferably encompasses a space below all of the sub-compartments, and the upper volume preferably encompasses a space above all of the sub-compartments.

The container may be used for storage and transportation of fishing lures. A fishing lure may be inserted into each one of the plurality of vertically oriented sub-compartments for storage of the lure. Each lure is preferably inserted vertically into a sub-compartment so that the end of the lure to which fishing line is attached is positioned at the upper end of the sub-compartment. If a leader is attached to the lure, the leader line may be coiled and stored within the upper volume of the container above the sub-compartments so that the leader line is accessible and does not become tangled. In addition, each of the individual sub-compartments keeps "J" hooks and treble hooks of fishing lures from getting tangled with each other. After a lure has been used for fishing, the lure may be stored in one of the sub-compartments, and any residual water remaining on the lure may be allowed to drain from the sub-compartment into the lower volume of the container through the opening in the sub-compartment bottom.

In a preferred embodiment, the container also has a drain disposed in the container wall near the container bottom. The lower volume is in fluid communication with an exterior of the container through the drain. Whenever there is an accumulation of water within the lower volume of the container, the water may be drained through the drain. The drain preferably includes a cap for capping the drain. In another preferred embodiment, the container also has a threaded hose fitting disposed in the container wall near the container bottom. The lower volume is in fluid communication with an exterior of the container through the hose fitting. A hose may be connected to the fitting and fresh water may then be supplied via the hose into the lower volume of the container. The fresh water from the hose may then enter all of the sub-compartments through the openings in the sub-compartment bottom. As fresh water fills the sub-compartments, lures contained in the sub-compartments are flushed with the fresh water to remove any residual saltwater from the lures. After flushing the container, the hose may be disconnected and the water may be allowed to drain from the container so that the lures may dry.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
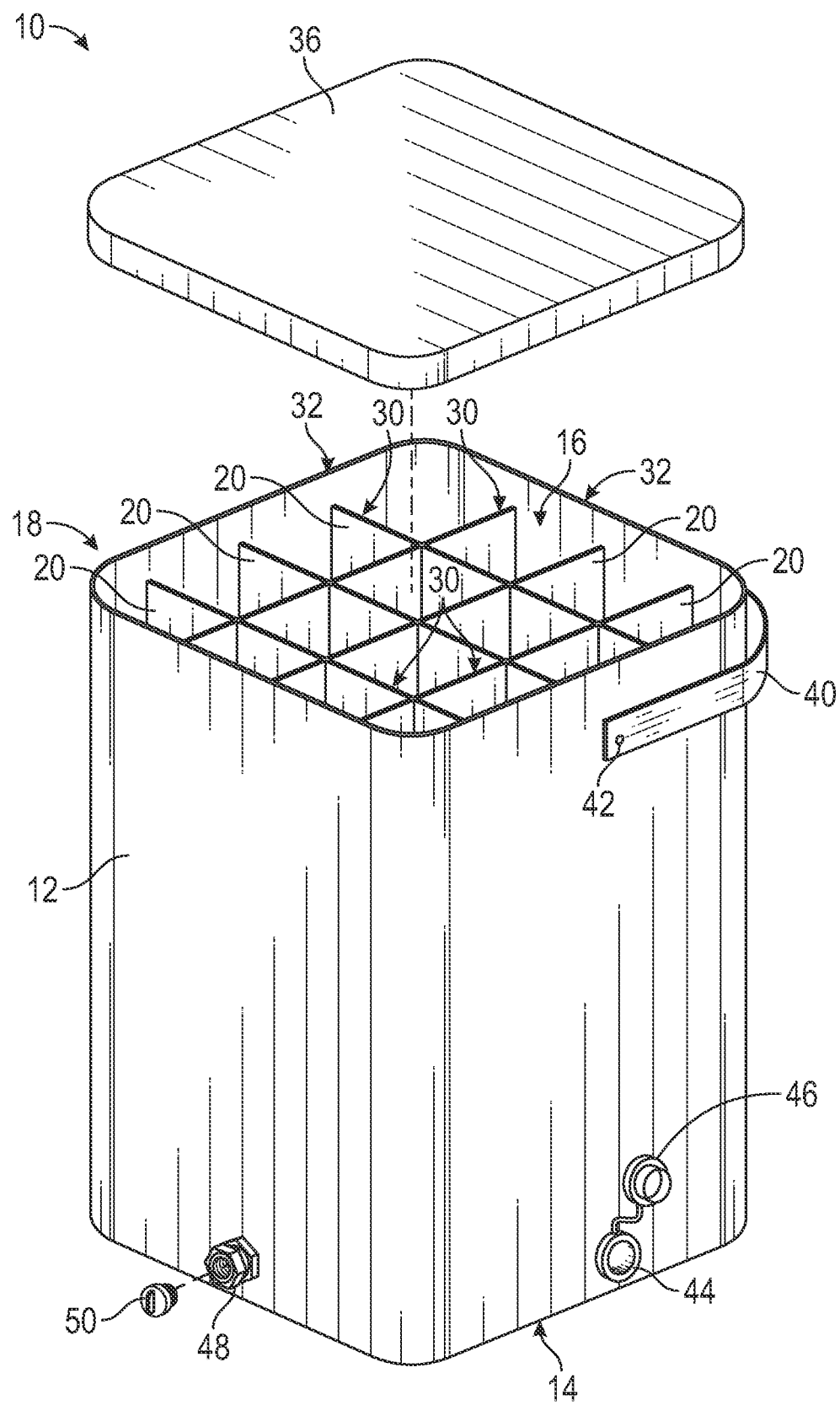
FIG. 1 shows a perspective view of a container for storing fishing lures in accordance with the present disclosure.
Figure 2:
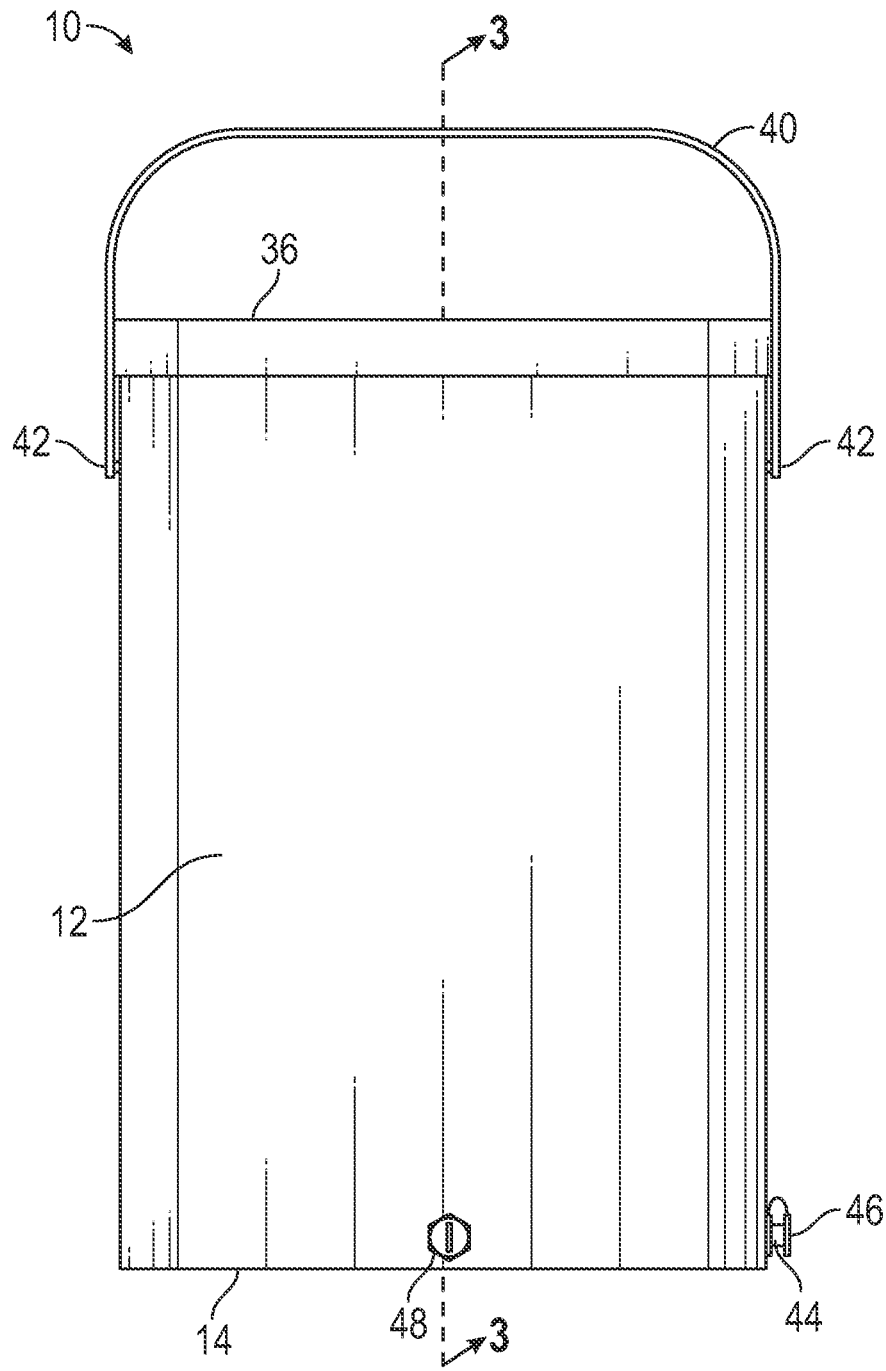
FIG. 2 shows a side elevational view of a container for storing fishing lures in accordance with the present disclosure.
Figure 3:
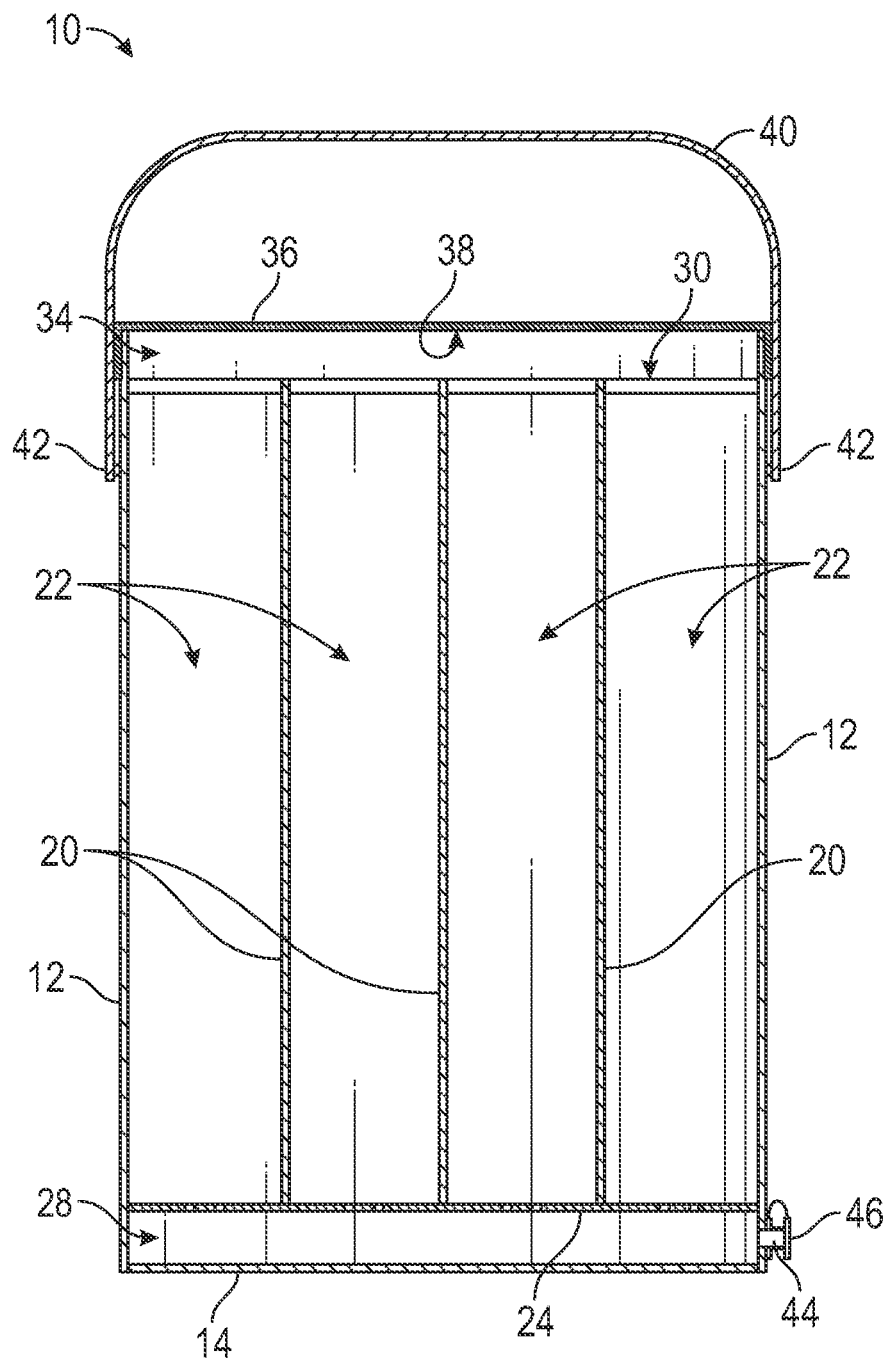
FIG. 3 shows a cross-sectional view of a container for storing fishing lures in accordance with the present disclosure as viewed along line 3-3.
Figure 4:
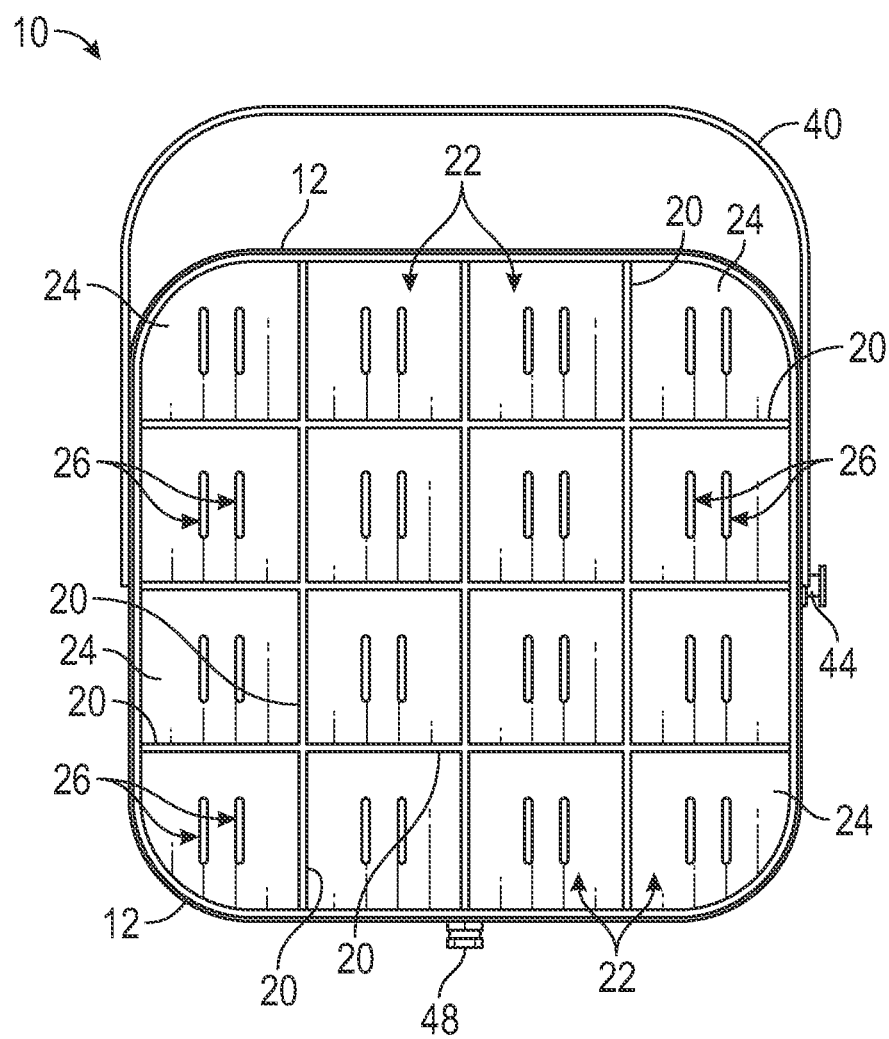
FIG. 4 shows a top plan view of a container for storing fishing lures with a top lid removed in accordance with the present disclosure.

In one aspect, a container 10 for storing fishing lures 52 is provided. FIGS. 1-5 illustrate a preferred embodiment of the container 10. The container 10 comprises a container bottom 14 and a container wall 12. The container wall 12 is connected to the container bottom 14 and extends upwardly from the container bottom 14. In a preferred embodiment, the container wall 12 is a continuous container wall that extends upwardly from the container bottom 14 around an entire perimeter of the container bottom 14. In one preferred embodiment, as best seen in FIGS. 1 and 4, the container bottom 14 and container wall 12 may have a cross-sectional shape that is generally square with rounded corners. In this case, the container wall 12 may include four sides connected to form a container wall that extends continuously around the perimeter of the container bottom 14. The four sides may include opposing front and rear walls and opposing side walls connecting the front and rear walls. In alternative embodiments, the container 10 may have a rectangular shape that is not square or may have a generally cylindrical shape with a container wall 12 that extends continuously around a circular perimeter of the container bottom 14. A rectangular or square container 10 may or may not have rounded corners.

Figure 5:
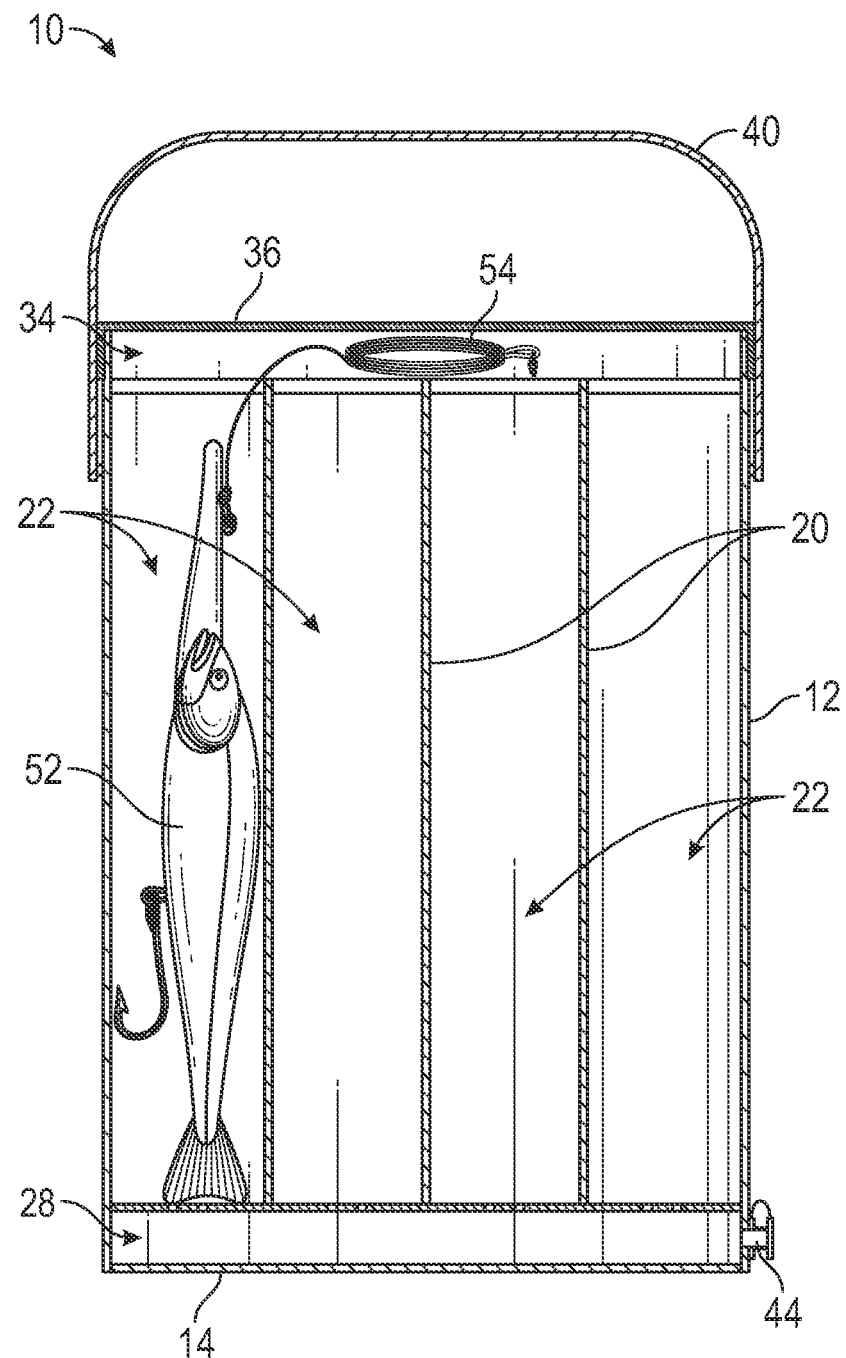
FIG. 5 shows a cross-sectional view of a container for storing fishing lures with a fishing lure and attached leader stored in the container.

The container bottom 14 and container wall 12 define a main compartment 16 of the container 10. As best seen in FIGS. 1 and 4, the main compartment 16 is subdivided into a plurality of sub-compartments 22 disposed within the main compartment 16 and separated by divider walls 20. The main compartment 16 has an open upper end 18 through which the sub-compartments 22 may be accessed. The container 10 preferably includes a lid 36 for covering the open upper end 18 to enclose the main compartment 16. As best seen in FIGS. 3 and 5, the sub-compartments 22 are vertically oriented so that each of the sub-compartments 22 is accessible through the open upper end 18 of the container 10 when the lid 36 is opened. Thus, an upper end of each sub-compartment 22 is open so that the sub-compartment 22 may receive a lure 52. The lure 52 may be vertically inserted into one of the sub-compartments 22 through the open upper end of the sub-compartment 22, as shown in FIG. 5. Each sub-compartment 22 may be elongated vertically from the upper end to a lower end and generally sized to receive a large, elongated fishing lure 52 of a size typically used for offshore fishing. The lid 36 is designed to fit onto the open upper end 18 of the main compartment 16 of the container 10, as best seen in FIG. 3, which shows a cross-sectional view of the container 10 with the lid 36 installed to enclose the main compartment 16 of the container 10. The lid 36 may be sized and shaped to fit securely around an upper edge 32 of the container wall 12. In one embodiment, as shown FIG. 1, the lid 36 may be designed to be completely removed from the container 10. Alternatively, the lid 36 may be attached to the container by a hinge that allows the lid to be pivoted between opened and closed positions.

In a preferred embodiment, as best seen in FIGS. 1 and 4, the divider walls may be arranged in a grid pattern with longitudinal and latitudinal divider walls 20 being perpendicular to each other. Longitudinal divider walls 20 may extend between a first set of two opposing container wall 12 sections of the container 10, such as a front and a rear wall, and latitudinal divider walls 20 may extend between a second set of two opposing container wall 12 sections of the container 10, such as opposing side walls connecting the front and rear walls. As best seen in FIG. 4, some of the sub-compartments 22 may be defined by two longitudinal divider walls 20 and two latitudinal divider walls 20. Other sub-compartments 22 may be defined by divider walls 20 and interior portions of the container wall 12 of the container 10. Such a configuration may form sub-compartments 22 having a generally square cross-sectional shape, though sub-compartments 22 positioned at corners of the container 10 may have rounded sections in the case in which the container wall 12 has rounded corners. In alternative embodiments, the sub-compartments may have other shapes, such as a circular cross-sectional shape, which may be defined by divider walls having different configurations. The divider walls 20 may preferably be permanently attached to an interior side of the container wall 12.

The container 10 further comprises a sub-compartment bottom 24 that defines a bottom of each of the sub-compartments 22. As best seen in FIG. 3, the sub-compartment bottom 24 is disposed within the main compartment 16 in a position above the container bottom 14 such that the sub-compartment bottom 24 and the container bottom 14 define a lower volume 28 disposed between the sub-compartment bottom 24 and the container bottom 14. The lower volume 28 may also be defined by portions of the container wall 12 around the perimeter of the container bottom 14. In a preferred embodiment, the sub-compartment bottom 24 comprises a generally planar element that is disposed parallel to the container bottom 14 and perpendicular to the container wall 12. A single planar element may form the sub-compartment bottom 24 collectively for all of the individual sub-compartments 22. A lower end of each of the divider walls 20 forming the sub-compartments 22 may be attached to the sub-compartment bottom 24. As shown in FIG. 4, the sub-compartment bottom 24 has a plurality of openings 26 extending through the sub-compartment bottom 24. Each respective sub-compartment 22 has at least one opening 26 corresponding to the sub-compartment 22 so that water may drain from each one of the sub-compartments 22 into the lower volume 28. Thus, each respective one of the sub-compartments 22 is in fluid communication with the lower volume 28 through at least one opening 26 in the sub-compartment bottom 24. In a preferred embodiment, each respective sub-compartment 22 has two openings 26. In another preferred embodiment, each of the openings 26 generally has the shape of an elongated slot.

As best seen in FIGS. 1 and 3, each of the divider walls 20 has an upper edge 30 that is positioned below an upper edge 32 of the container wall 12 such that an upper volume 34 is disposed between the upper edge 30 of each of the divider walls 20 and the upper edge 32 of the container wall 12. Further, when the lid 36 is placed onto the container 10 to close the container, the upper volume 34 is disposed between the upper edge 30 of each of the divider walls 20 and an interior side 38 of the lid 36, as shown in FIG. 3. In a preferred embodiment, as also shown in FIG. 3, the lower volume 28 may encompass a space below all of the sub-compartments 22, and the upper volume 34 may encompass a space above all of the sub-compartments 22. In a preferred embodiment, the lower volume 28 has a vertical height between the container bottom 14 and the sub-compartment bottom 24 of at least one inch to provide an adequate volume for draining all of the sub-compartments 22. In a preferred embodiment, the upper volume 34 has a vertical height between the upper edge 30 of each of the divider walls 20 and both the upper edge 32 of the container wall 12 and the interior side 38 of the lid 36 of at least one inch to provide an adequate space for storing multiple leaders 54 within the space that are attached to multiple lures 52 stored within the sub-compartments 22.

The container 10 may be used for storage and transportation of fishing lures 52. A fishing lure 52 may be inserted into each one of the plurality of vertically oriented sub-compartments 22 for storage of the lure 52. Each lure 52 is preferably inserted vertically into a sub-compartment 22 so that the end of the lure 52 to which fishing line is attached is positioned at the upper end of the sub-compartment 22, as shown in FIG. 5. FIG. 5 illustrates only one lure 52 disposed in one sub-compartment 22, but at least one lure 52 may be stored in each respective one of the sub-compartments 22 of the container 10. If a leader 54 is tied to the lure 52, the leader line 54 may be coiled and stored within the upper volume 34 of the container 10 above the sub-compartments 22, as shown in FIG. 5. This allows the leader line 54 to be accessible without becoming tangled. Even if multiple lures 54 each having leaders 54 attached thereto are stored within the container 10, the leader lines 54 may all be coiled and stored within the upper volume 34 of the container without becoming tangled with each other. After a lure 52 has been used for fishing, the lure 52 may be stored in one of the sub-compartments 22, and any residual water remaining on the lure may be allowed to drain from the sub-compartment 22 into the lower volume 28 of the container 10 through the openings 26 in the sub-compartment bottom 24.

In a preferred embodiment, as best seen in FIG. 1, the container 10 also has a drain 44 disposed in the container wall 12 near the container bottom 14. The lower volume 28 is in fluid communication with an exterior of the container 10 through the drain 44. Whenever there is an accumulation of water within the lower volume 28 of the container 10, the water may be drained through the drain 44. The drain 44 preferably includes a cap 46 designed to cap the drain 44 to prevent drainage when the cap 46 is installed. In another preferred embodiment, the container 10 also has a threaded hose fitting 48 disposed in the container wall 12 near the container bottom 14. The lower volume 28 is in fluid communication with an exterior of the container 10 through the hose fitting 48. The hose fitting 48 is designed to connect to a hose (not shown) having a threaded end. The hose may be connected to the fitting 48 and fresh water may then be supplied via the hose into the lower volume 28 of the container 10. The fresh water from the hose may then enter all of the sub-compartments 22 through the openings 26 in the sub-compartment bottom 24. As fresh water fills the sub-compartments 22, lures 52 contained in the sub-compartments 22 are flushed with the fresh water to remove any residual saltwater from the lures 52 in order to prevent corrosion of the hooks or other metal components of the lure 52. The container 10 may be flushed with fresh water with the lid 36 removed until water overflows out of the open upper end 18 of the container 10 and over the upper edge 32 of the container wall 12. The cap 46 may be installed on the drain 44 to prevent water from leaking from the container 10 during flushing. After flushing the container 10 with fresh water from the hose, the hose may then be disconnected and the fresh water contained within the main compartment 16 of the container 10, which includes all sub-compartments 22 and the lower volume 28 and upper volume 34, may be allowed to drain from the container 10 through the drain 44 so that the lures 52 contained therein may dry. The container 10 preferably includes a threaded hose fitting cap 50 designed to cap the hose fitting 48 to prevent drainage when the hose fitting cap 50 is installed. In one alternative embodiment, a single aperture in the container wall 12 designed to connect to a hose may also function as the drain 44, although separate apertures may be preferred so that water may be drained from the container 10 via the drain 44 while a water hose remains connected to the hose fitting 48.

In a preferred embodiment, the container 10 further comprises a handle 40 for carrying the container 10 when transporting. The handle 40 is preferably attached to opposing exterior sides of the container wall 12 of the container 10 by hinges 42 so that the handle 40 may be pivoted downward, as shown in FIG. 1, when not in use and upward, as shown in FIG. 2, for carrying the container 10.

The container 10, divider walls 20, and lid 36 may be constructed of a molded plastic material, such as marine-grade HDPE (high-density polyethylene). In a preferred embodiment, the container bottom 14 may have a non-skid material, such as EVA (ethylene-vinyl acetate) foam, externally attached to a bottom side of the container bottom 14 to reduce sliding when the container is on a boat. In one preferred embodiment, the container 10 may have a height of approximately sixteen (16) inches from the container bottom 14 to the upper edge 32 of the container wall 12 and may also have a width of approximately twelve (12) inches. In one preferred embodiment, each of the sub-compartments 22 may have a height of approximately fourteen (14) inches and a width of approximately three (3) inches. Other sizes of the container 10 and the sub-compartments 22 may be utilized to accommodate lures 52 of different sizes and still fall within the scope of the present disclosure.

It will be appreciated that the configurations and methods shown and described herein are illustrative only, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein. It is understood that versions of the invention may come in different forms and embodiments. Additionally, it is understood that one of skill in the art would appreciate these various forms and embodiments as falling within the scope of the invention as disclosed herein.

What is claimed is:

1. A container, comprising:
    a container wall and a container bottom, wherein the container wall is connected to the container bottom and extends upwardly from the container bottom, wherein the container bottom and the container wall define a main compartment having an open upper end;
    a plurality of divider walls disposed within the main compartment, wherein the plurality of divider walls define a plurality of sub-compartments within the main compartment; and
    a sub-compartment bottom disposed within the main compartment in a position above the container bottom such that the sub-compartment bottom and the container bottom define a lower volume disposed between the sub-compartment bottom and the container bottom, wherein the sub-compartment bottom has a plurality of openings extending through the sub-compartment bottom, wherein each respective sub-compartment within the plurality of sub-compartments is in fluid communication with the lower volume through a respective one of the openings of the plurality of openings in the sub-compartment bottom, and
    wherein each of the plurality of divider walls has an upper edge that is positioned below an upper edge of the container wall such that an upper volume is disposed between the upper edge of each of the plurality of divider walls and the upper edge of the container wall.

2. The container of claim 1, wherein the lower volume encompasses a space below all of the sub-compartments of the plurality of sub-compartments, and wherein the upper volume encompasses a space above all of the sub-compartments of the plurality of sub-compartments.

3. The container of claim 1, further comprising a drain disposed in the container wall of the container, wherein the lower volume is in fluid communication with an exterior of the container through the drain.

4. The container of claim 3, further comprising a cap designed to cap the drain.

5. The container of claim 1, further comprising a threaded hose fitting disposed in the container wall of the container, wherein the hose fitting is designed to connect to a hose having a threaded end, wherein the lower volume is in fluid communication with an exterior of the container through the hose fitting.

6. The container of claim 5, further comprising a threaded hose fitting cap designed to cap the hose fitting.

7. The container of claim 1, further comprising a lid designed to fit onto the open upper end of the main compartment of the container.

8. The container of claim 7, wherein the upper volume is disposed between the upper edge of each of the plurality of divider walls and an interior side of the lid when the lid is in a closed position in which the lid is covering the open upper end of the main compartment of the container.

9. The container of claim 1, further comprising a handle, wherein the handle is attached to opposing exterior sides of the container wall by hinges.

10. A container, comprising:
    a container wall and a container bottom, wherein the container wall is connected to the container bottom and extends upwardly from the container bottom, wherein the container bottom and the container wall define a main compartment having an open upper end; and
    a plurality of sub-compartments disposed within the main compartment, wherein the plurality of sub-compartments are divided by divider walls,
    wherein each of the plurality of sub-compartments has a sub-compartment bottom having an opening extending through the sub-compartment bottom,
    wherein each sub-compartment bottom is disposed within the main compartment in a position above the container bottom such that the sub-compartment bottoms and the container bottom define a lower volume disposed between the plurality of sub-compartment bottoms and the container bottom, wherein each of the sub-compartments is in fluid communication with the lower volume through the opening in the sub-compartment bottom, and
    wherein each of the divider walls has an upper edge that is positioned below an upper edge of the container wall such that an upper volume is disposed between the upper edge of each of the divider walls and the upper edge of the container wall.

11. The container of claim 10, wherein the lower volume encompasses a space below all of the plurality of sub-compartments, and wherein the upper volume encompasses a space above all of the plurality of sub-compartments.

12. The container of claim 10, further comprising a drain disposed in the container wall of the container, wherein the lower volume is in fluid communication with an exterior of the container through the drain.

13. The container of claim 12, further comprising a cap designed to cap the drain.

14. The container of claim 10, further comprising a threaded hose fitting disposed in the container wall of the container, wherein the hose fitting is designed to connect to a hose having a threaded end, wherein the lower volume is in fluid communication with an exterior of the container through the hose fitting.

15. The container of claim 14, further comprising a threaded hose fitting cap designed to cap the hose fitting.

16. The container of claim 10, further comprising a lid designed to fit onto the open upper end of the main compartment of the container.

17. The container of claim 16, wherein the upper volume is disposed between the upper edge of each of the divider walls and an interior side of the lid when the lid is in a closed position in which the lid is covering the open upper end of the main compartment of the container.

18. The container of claim 10, further comprising a handle, wherein the handle is attached to opposing exterior sides of the container wall by hinges.

19. A method of using a container to store a fishing lure, wherein the method comprises the steps of:
    providing a container comprising:
        a container wall and a container bottom, wherein the container wall is connected to the container bottom and extends upwardly from the container bottom, wherein the container bottom and the container wall define a main compartment having an open upper end;

a plurality of divider walls disposed within the main compartment, wherein the plurality of divider walls define a plurality of sub-compartments within the main compartment; and a sub-compartment bottom disposed within the main compartment in a position above the container bottom such that the sub-compartment bottom and the container bottom define a lower volume disposed between the sub-compartment bottom and the container bottom, wherein the sub-compartment bottom has a plurality of openings extending through the sub-compartment bottom, wherein each respective sub-compartment of the plurality of sub-compartments is in fluid communication with the lower volume through a respective one of the openings of the plurality of openings in the sub-compartment bottom, and wherein each of the plurality of divider walls has an upper edge that is positioned below an upper edge of the container wall such that an upper volume is disposed between the upper edge of each of the plurality of divider walls and the upper edge of the container wall; and placing a fishing lure into one respective sub-compartment of the plurality of sub-compartments.

20. The method of claim 19, wherein the container further comprises a threaded hose fitting disposed in the container wall of the container, wherein the hose fitting is designed to connect to a hose having a threaded end, wherein the lower volume is in fluid communication with an exterior of the container through the hose fitting, wherein the method further comprises the step of connecting a water hose to the hose fitting and flushing an interior of the container by supplying water into the lower volume of the container.

* * * * *